Nov. 7, 1950   R. F. SMITH   2,528,796
VALVE MECHANISM
Filed Dec. 29, 1944
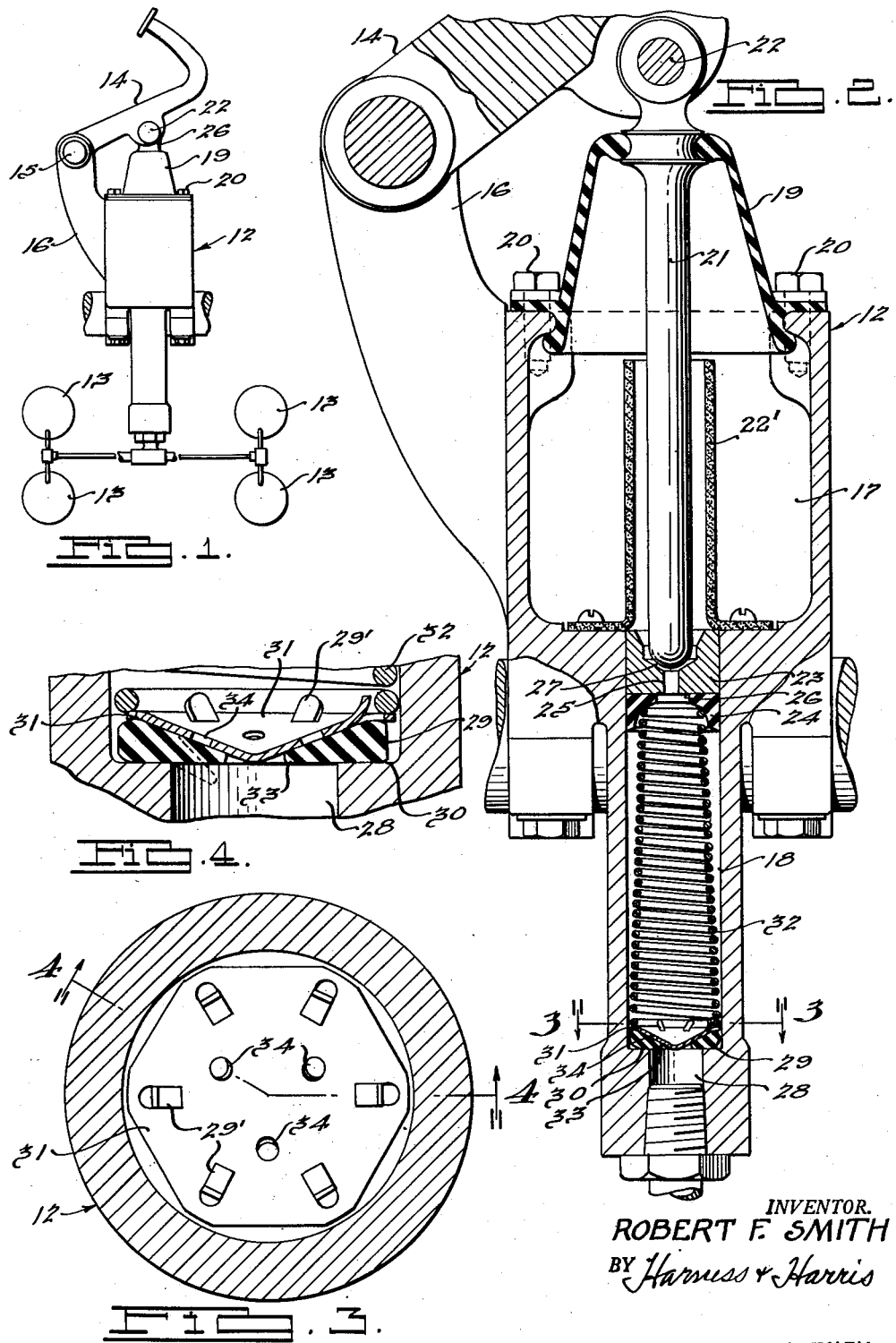
INVENTOR.
ROBERT F. SMITH
BY Harness & Harris
ATTORNEYS.

Patented Nov. 7, 1950

2,528,796

UNITED STATES PATENT OFFICE 2,528,796

VALVE MECHANISM

Robert F. Smith, Detroit, Mich., assignor to Chrysler Corporation, Highland Park, Mich., a corporation of Delaware Application December 29, 1944, Serial No. 570,299

1 Claim. (Cl. 277—45)

This invention relates to an improved valve mechanism, particularly applicable to hydraulic brake systems although not limited thereto in its broad aspects.

A hydraulic brake system of the type applicable to motor vehicles includes a master cylinder from which a fluid operating medium is forced under pressure to wheel brake cylinders. A double acting valve mechanism is preferably employed which permits fluid to leave the cylinder but restrains the return thereto in order to maintain a predetermined pressure in the wheel cylinders.

An object of the invention is the provision of an improved valve mechanism comprising a minimum number of cooperating parts which do not necessitate exacting dimensional relationship for successful operation of the mechanism.

More particularly, an object of the invention is the provision of a double acting valve mechanism including cooperatively engaged parts, one thereof being adapted for deflection into and out of sealing relation with the othter during operation of the mechanism, the parts being so contoured and engaged that the deffectible part tends to maintain the sealing relation and relative expansion of the parts does not result in unintended disruption of the sealing relation.

A still further object of the invention is the provision of a valve mechanism of the foregoing type wherein the aforesaid cooperating parts of the mechanism are provided with fluid passage-forming openings so arranged as to facilitate intended deflection of the deflectible part into and out of its sealing relation.

Other objects and advantages of the invention will be more apparent from the following description taken in connection with the accompanying drawings, wherein:

Fig. 1 is a schematic view of a hydraulic brake system embodying the invention.

Fig. 2 is an enlarged elevational view, mainly in section, of the master cylinder of Fig. 1 and showing the valve mechanism.

Fig. 3 is an enlarged view taken on line 3—3 of Fig. 2, but omitting the spring.

Fig. 4 is a fragmentary sectional view taken on line 4—4 of Fig. 3.

Referring to the drawings, the invention is embodied in a hydraulic brake system of the type particularly adapted for motor vehicles and which includes a casing 12 providing the master cylinder, wheel brake cylinders indicated at 13, connected by fluid lines to the master cylinder, and an operating pedal 14 pivoted at 15 to a support 16. The master cylinder and its associated operating structure, other than the specific valve mechanism hereinafter set forth, forms the subject matter of application of Robert F. Smith and Bruce E. Clark, Serial No. 570,298 filed December 29, 1944 now Patent No. 2,447,142 granted August 17, 1948.

The master cylinder provided by the casing 12 includes a fluid reservoir 17 at the upper portion thereof and a pressure cylinder 18 at the lower end portion. A flexible, bell-shaped boot 19 closes the upper end portion of the casing, the boot having a peripheral flange abutting and secured to casing flange by screws 20, and a central opening receiving a piston actuating rod 21 connected at 22 to the pedal 14. A filter 22' has a cylindrical filtering portion into which the rod 21 extends and a flange seated on and secured to the bottom wall of the reservoir 17.

The upper end of the cylinder 18 is provided with a piston 23 and a packing cup 24 abutting the lower face of this piston, the cylinder 18 being in fluid communication with the reservoir 17 by means of the registering openings 25 and 26 respectively in the piston and cup. The piston 23 is provided with a seat 27 inclined downwardly and inwardly toward and surrounding the opening 25, which seat is engaged by the end of the end of the rod 21 to close the opening 25 to the passage of fluid therethrough during the pressure stroke of the rod 21 as will be hereinafter more fully set forth.

Fluid is discharged from the cylinder 18 to the fluid lines leading to the wheel cylinders 13 through a port-forming opening 28 at the lower end of the casing 12. Associated with this port is a valve mechanism including a resiliently yieldable member 29 adapted to rest against a valve seat 30 surrounding the port and a relatively rigid member 31 engaging the member 29. A coil spring 32 is interposed between the piston sealing cup 24 and the member 31 for urging the member 29 against the valve seat 30, ears 29' struck from the member 31 serving to limit shifting of the spring. The member 29 is preferably formed of rubber or a rubber-like material and is provided with a central opening 33 registering with the port. The member 29 is tapered between a maximum thickness adjacent the outer periphery to a minimum thickness at the opening 33 and the upper face thereof engaged by the member 31 is inclined downwardly and inwardly from the aforesaid periphery to the opening 33. In order to exert pressure against the entire surface of this engaged face the member 31 is correspondingly contoured at its engaging face.

The member 29 has a portion thereof overhanging the port-forming opening 26 and the member 31 has a plurality of apertures 34 therethrough which register with the overhanging portion of the member 29. As the piston 23 and cup 24 are moved downwardly by corresponding movement of the rod 21 by the pedal 14, fluid trapped in the cylinder 18 by sealing engagement of the rod end with the piston seat 27 passes through the apertures 34 forcing the central portion of the member 29 out of its normal sealing engagement with the rigid member 31 and allowing the fluid to pass through the opening 33 to the port-forming opening 28 to the wheel brake cylinders for application of the brakes. Upon release of the pedal and return thereof to normal position the rod 21 will be moved upwardly thereby; however, the piston 23 will not be positively correspondingly moved thereby but will be returned to illustrated position by the spring 32, the filter 22' limiting upward return movement. As the pressure is relieved by upward movement of the piston the portion of the member deflected as aforesaid from the member 31 will return to its illustrated full-line position through its inherent tendency to so return, the fluid pressure from the wheel brake cylinders and fluid lines also acting to effect this return. The valve will be moved from its seat when the pressure trapped in the lines and wheel cylinders is sufficient to overcome the force of the spring 32, whereupon fluid will then pass between the outer peripheral edge of the members 29, 31 and the wall of the cylinder into the latter. Return of the actuating rod to its normal position uncovers the opening 25 in the piston 23 to establish fluid communication between the cylinder 18 and reservoir 17.

In the illustrated embodiment the resilient member 29 is freely expansible laterally with respect to the member 31, the outer peripheral edge of the former being spaced from the latter and not constrained thereby. Freedom for expansion of the member 29 due to heat or reaction to its association with the fluid operating medium avoids unintended opening of the valve resulting from buckling of the resilient member due to constraint, as by the member 31, against expansion.

Although but one specific embodiment of the invention is herein shown and described, it will be understood that various changes in the size, shape and arrangement of parts may be made without departing from the spirit of the invention.

I claim:

A valve mechanism including a valve seat and a port associated therewith, a resiliently yieldable member engageable with said valve seat, a relatively rigid member normaly engaging said yieldable member, said yieldable member having a portion of tapering reduced cross-sectional thickness overhanging said port normally engaged with said rigid member in sealing relation and provided with an opening registering with said port, said rigid member having an aperture for admitting fluid to said reduced portion whereby the latter is deflected out of sealing engagement with the rigid member under influence of a predetermined fluid pressure to provide passage through the aperture and opening in one direction, and a coil spring urging said members into engagement and said yieldable member against said seat, one end of said spring being seated on said relative rigid member and the latter having a plurality of ears integral therewith cooperating with said spring one end for limiting shifting of said spring relative to said relative rigid member, said ears being disposed in the space bounded by said spring one end.

ROBERT F. SMITH.

REFERENCES CITED

The following references are of record in the file of this patent:

UNITED STATES PATENTS

| Number | Name | Date |
|---|---|---|
| 1,841,354 | Bowman | Jan. 19, 1932 |
| 1,885,121 | Loweke | Nov. 1, 1932 |
| 1,964,249 | Chase | June 26, 1934 |
| 2,009,104 | Carroll | July 23, 1935 |
| 2,011,812 | Hatcher | Aug. 20, 1935 |
| 2,133,575 | Rosenberg | Oct. 18, 1938 |
| 2,135,004 | Heidloff | Nov. 1, 1938 |